US012533744B2

(12) United States Patent
Sato et al.

(10) Patent No.: US 12,533,744 B2
(45) Date of Patent: Jan. 27, 2026

(54) ROTATING MEMBER FOR FRICTION STIRRING, WELDING APPARATUS, AND WELDING METHOD (71) Applicant: KEIHIN RAMTECH CO., LTD., Yokohama (JP)

(72) Inventors: Ippei Sato, Yokohama (JP); Toshiyuki Nezu, Yokohama (JP); Yoshiyuki Takaseki, Yokohama (JP)

(73) Assignee: KEIHIN RAMTECH CO., LTD., Yokohama (JP)

( * ) Notice: Subject to any disclaimer, the term of this patent is extended or adjusted under 35 U.S.C. 154(b) by 0 days.

(21) Appl. No.: 18/714,204

(22) PCT Filed: Nov. 1, 2023

(86) PCT No.: PCT/JP2023/039467
§ 371 (c)(1),
(2) Date: May 29, 2024

(87) PCT Pub. No.: WO2025/094318
PCT Pub. Date: May 8, 2025

(65) Prior Publication Data
US 2025/0135573 A1    May 1, 2025

(51) Int. Cl.
*B23K 20/00* (2006.01)
*B23K 20/12* (2006.01)

(52) U.S. Cl.
CPC ........ *B23K 20/125* (2013.01); *B23K 20/1225* (2013.01)

(58) Field of Classification Search
CPC ............. B23K 20/1255; B23K 20/125; B23K 20/126; B23K 20/123; B23K 20/122; B23K 20/1245
See application file for complete search history.

(56) References Cited

U.S. PATENT DOCUMENTS 5,697,544 A * 12/1997 Wykes ................. B23K 20/125
228/2.1
5,713,507 A * 2/1998 Holt ..................... B23K 20/125
228/234.1

(Continued)

FOREIGN PATENT DOCUMENTS

EP         2255918      12/2010
JP       50-022040       7/1975

(Continued)

OTHER PUBLICATIONS

WO2022/118590A1 computer English translation (Year: 2022).*
International Search Report; Int. App. No. PCT/JP2023/039467, Jan. 16, 2024.

*Primary Examiner* — Erin B Saad
(74) *Attorney, Agent, or Firm* — Simpson & Simpson, PLLC; S. Peter Konzel (57) ABSTRACT The present teaching, which relates to friction stir welding, aims to provide a rotating member for friction stirring capable of welding with a high strength and with occurrence of a welding defect suppressed. A rotating member for friction stirring installed in a welding apparatus for performing friction stir welding of a welding object member is configured such that when the rotating member for friction stirring is arranged to an output shaft of a driving mechanism included in the welding apparatus so as to be rotated by rotation outputted from the driving mechanism, a clearance is formed between the output shaft and a pin portion, which is to be inserted into the welding object member at a time of friction stirring, the clearance allowing the pin portion to vibrate relative to the output shaft, and due to the clearance, at a time of friction stirring, a vibration of the pin portion has a larger amplitude and/or a higher frequency than a vibration of the output shaft.

18 Claims, 3 Drawing Sheets

(56) References Cited

U.S. PATENT DOCUMENTS

| | | | | |
|---|---|---|---|---|
| 6,247,633 | B1* | 6/2001 | White | B23K 20/123 228/2.1 |
| 7,677,427 | B2* | 3/2010 | Fukuhara | B23K 20/125 228/2.1 |
| 8,814,027 | B2* | 8/2014 | Hori | B23K 20/1265 228/2.1 |
| 10,022,817 | B2* | 7/2018 | Maruko | B23K 20/1255 |
| 11,484,967 | B2* | 11/2022 | Eller | B21C 27/00 |
| 11,938,559 | B2* | 3/2024 | Ouchi | B23K 20/126 |
| 11,969,818 | B1* | 4/2024 | Wang | B23K 20/1255 |
| 2002/0014516 | A1* | 2/2002 | Nelson | B23K 20/227 228/2.1 |
| 2002/0179673 | A1* | 12/2002 | Strombeck | B23K 20/125 228/1.1 |
| 2006/0163316 | A1* | 7/2006 | Burton | B23K 20/125 228/2.1 |
| 2006/0169741 | A1* | 8/2006 | Smith | B23K 20/126 228/2.1 |
| 2006/0213954 | A1* | 9/2006 | Ruther | B21J 15/027 228/114.5 |
| 2007/0152015 | A1* | 7/2007 | Burton | B23K 20/1265 228/2.1 |
| 2009/0152328 | A1* | 6/2009 | Okamoto | B23K 20/128 228/2.1 |
| 2014/0217151 | A1* | 8/2014 | Miyahara | B23B 31/11 228/2.1 |
| 2017/0021448 | A1* | 1/2017 | Saito | B23K 37/0282 |
| 2020/0376590 | A1* | 12/2020 | Weigl | B23K 20/1255 |
| 2021/0008658 | A1* | 1/2021 | Frank | B23K 20/00 |
| 2022/0226928 | A1* | 7/2022 | Ouchi | B23K 20/1255 |
| 2022/0331897 | A1* | 10/2022 | Pierron | B23K 20/1255 |
| 2022/0339734 | A1* | 10/2022 | Miyake | B23K 20/125 |
| 2023/0249279 | A1* | 8/2023 | Sevestre | B23K 20/1225 228/112.1 |
| 2024/0001478 | A1* | 1/2024 | Seo | B23K 20/125 |
| 2024/0009757 | A1* | 1/2024 | Seo | B23K 20/1255 |
| 2024/0181559 | A1* | 6/2024 | Liang | B23K 20/1215 |
| 2024/0316688 | A1* | 9/2024 | Lin | B25J 11/005 |
| 2025/0058404 | A1* | 2/2025 | Seo | B23K 20/12 |
| 2025/0058405 | A1* | 2/2025 | Seo | B23K 20/12 |

FOREIGN PATENT DOCUMENTS

| | | |
|---|---|---|
| JP | 2022007462 | 1/2022 |
| JP | 7225479 | 2/2023 |
| JP | 2023-69370 | 5/2023 |
| JP | 2023-69371 | 5/2023 |
| JP | 2023069372 A | 5/2023 |

* cited by examiner

Prior Art

FIG. 3

ROTATING MEMBER FOR FRICTION STIRRING, WELDING APPARATUS, AND WELDING METHOD

CROSS REFERENCE TO RELATED APPLICATIONS

This application is the National Stage of, and claims priority under 35 USC 371 to, International App. No. PCT/JP2023/039,467, filed Nov. 1, 2023, which application is incorporated herein by reference in its entirety.

TECHNICAL FIELD

The present teaching relates to a rotating member for friction stirring, a welding apparatus, and a welding method, which are for friction stir welding (FSW).

BACKGROUND ART

In Patent Literature 1 (PTL 1), a stirring pin is arranged in a main body part such that the stirring pin, by receiving a rotation force from the main body part, can rotate and can move relative to the axial direction of a rotation shaft. Further provided is a first elastic member (such as a coiled spring) that biases the stirring pin toward the distal end side relative to the axial direction of the rotation shaft. A shoulder is arranged in the main body part such that the shoulder can move in the axial direction of the rotation shaft, independently of the stirring pin, without receiving a rotation force from the main body part. Further provided is a second elastic member that biases the shoulder toward the distal end side relative to the axial direction of the rotation shaft. Even if, while the stirring pin is thrusted into a welding object member at a fixed level, the level of the welding object member changes, the first elastic member deforms in accordance with the change of the welding object member, so that the amount of insertion of the stirring pin is kept constant ([0041]). Since the effect of the first elastic member allows the stirring pin to be inserted into the welding object member up to a fixed depth, a plasticization region is formed at the fixed depth ([0071]). In the technique of PTL 1, as described above, the first elastic member biases the stirring pin toward the welding object member, to insert the stirring pin into the welding object member up to the fixed depth.

In Patent Literature 2 (PTL 2), a stirring pin and a shoulder constitute an assembly. In the assembly, the stirring pin and the shoulder can rotate relative to each other, and can integrally move in the axial direction of a rotation shaft. Further provided is a first elastic member (such as a coiled spring) that biases the assembly toward the distal end side of the stirring pin relative to the axial direction of the rotation shaft. In the technique of PTL 2, too, thanks to the first elastic member, the amount of insertion of the stirring pin is kept constant, and a plasticization region is formed at a fixed depth ([0033], [0052]).

In Patent Literature 3 (PTL 3), a rotary tool includes a main body part and a stirring member. The main body part includes a fixed portion attached and fixed to a welding apparatus, and a rotation shaft that transmits a rotation force from the welding apparatus. The stirring member, which has a stirring pin, is disposed such that the stirring member can rotate by receiving a rotation force from the rotation shaft, and is disposed in the main body part such that the stirring member can move relative to the axial direction of the rotation shaft. Further provided is an elastic member (coiled spring) that biases the stirring member toward the distal end side in the axial direction of the rotation shaft. In the technique of PTL 3, too, thanks to the elastic member, the amount of insertion of the stirring pin is kept constant, and a plasticization region is formed at a fixed depth ([0035], [0051]).

In any of PTL 1 to PTL 3, by means of the elastic member (coiled spring), the stirring pin is biased toward the welding object member and pressed against the welding object member, with the amount of insertion of the stirring pin being kept constant, so that the plasticization region is formed at a fixed depth.

CITATION LIST

Patent Literature

PTL 1: Japanese Patent Application Laid-Open No. 2023-069370
PTL 2: Japanese Patent Application Laid-Open No. 2023-069371
PTL 3: Japanese Patent Application Laid-Open No. 2023-069372

SUMMARY OF INVENTION

Technical Problem

In friction stir welding, it is desired that a rotating member for friction stirring, a welding apparatus, and a welding method be provided that are capable of welding with a high strength and with occurrence of a welding defect being suppressed.

The present teaching, which relates to friction stir welding, aims to provide a rotating member for friction stirring, a welding apparatus, and a welding method that are capable of welding with a high strength and with occurrence of a welding defect being suppressed.

Solution to the Problem

As a result of the earnest investigation with the above taken into account, the inventors of the present teaching discovered the following.

Conventionally, in friction stir welding, a support structure for supporting a stirring pin has been designed with a concept in which the stability of the stirring pin, while performing friction stirring, is high regards. This has involved forcible application of an external force in order to make it possible to bias the stirring pin toward a welding object member so that the stirring pin can be pushed against and inserted into the welding object member in as stable a manner as possible. In PTL 1 to PTL 3, as with the above, the elastic member is provided for the purpose of keeping the amount of insertion of the stirring pin constant to form the plasticization region at a fixed depth. PTL 1 to PTL 3 belong to a range of the conventional design concept.

The inventors of the present teaching changed the viewpoint from the conventional design concept, to discover that welding with a high strength and with occurrence of a welding defect being suppressed can be obtained when a pin portion to be inserted into a welding object member is intentionally passively vibrated at a larger amplitude and/or a higher frequency than a base vibration by contact of the pin portion with the welding object member, which is being given properties of a plastic flow, and thus have accomplished the present teaching. This knowledge is quite different from the conventional friction stir welding described above. Thus, even those skilled in the art could not easily arrive at this knowledge based on the technique of the conventional friction stir welding. In the present teaching, the following configurations can be adopted.

(1) A rotating member for friction stirring installed in a welding apparatus for performing friction stir welding of a welding object member, the rotating member for friction stirring being configured such that when the rotating member for friction stirring is arranged to an output shaft of a driving mechanism included in the welding apparatus so as to be rotated by rotation outputted from the driving mechanism, a clearance is formed between the output shaft and a pin portion, which is to be inserted into the welding object member at a time of friction stirring, the clearance allowing the pin portion to vibrate relative to the output shaft, and due to the clearance, at a time of friction stirring, a vibration of the pin portion has a larger amplitude and/or a higher frequency than a vibration of the output shaft.

In the rotating member for friction stirring according to (1), the clearance that allows the pin portion to vibrate relative to the output shaft is disposed between the output shaft and the pin portion. The rotating member for friction stirring is configured such that due to the clearance, at a time of friction stirring, a vibration of the pin portion has a larger amplitude and/or a higher frequency than a vibration of the output shaft. The output shaft of the driving mechanism, at a time of friction stirring, vibrates along with rotation received from the driving mechanism. This vibration is also called a base vibration. The base vibration is one that unavoidably occurs in friction stirring. At a time of friction stirring, the vibration of the pin portion has a larger amplitude and/or a higher frequency than the base vibration. At a time of friction stirring, the pin portion rotates while moving so as to parry the plastically flowing welding object member within a range allowed by the clearance, instead of resisting the plastically flowing welding object member. This movement generates the vibration of the pin portion. That is, the vibration of the pin portion is caused by the clearance. The vibration of the pin portion is not a vibration caused by an output from a driving source other than the driving mechanism. The vibration of the pin portion is less likely to hinder the plastic flow of the welding object member. Moreover, the vibration of the pin portion is capable of synchronization with the plastic flow of the welding object member. Thus, the vibration of the pin portion can amplify the plastic flow of the welding object member. The vibration of the pin portion, therefore, allows welding to be performed with a high strength and with occurrence of a welding defect being suppressed. In addition, the tilt angle (advanced angle) of the rotating member for friction stirring and the output shaft may be zero degrees. Even when the tilt angle is zero degrees, it is possible to provide ample friction stir welding. Since the above-described vibration of the pin portion can be obtained due to the clearance, a complicated main shaft mechanism is not necessary. Generation of excessive frictional heat can be suppressed. Generation of excessive friction applied to the pin portion can be suppressed. The vibration of the pin portion can suppress transmission of a vibration from the downstream side to the upstream side of the clearance in a power transmission path extending from the driving mechanism to the pin portion. A reduced load can be applied to the output shaft.

It may be acceptable that the rotating member for friction stirring has the clearance provided in the rotating member for friction stirring itself. The rotating member for friction stirring may be configured such that the clearance between the rotating member for friction stirring and the output shaft is formed when the rotating member for friction stirring is attached to the output shaft. The rotating member for friction stirring may be configured such that the rotating member for friction stirring does not include the pin portion, but the pin portion is attached to the rotating member for friction stirring, to form the clearance between the rotating member for friction stirring and the pin portion. The welding apparatus is not particularly limited, and does not always have to be an apparatus dedicated to friction stir welding. Other examples of the welding apparatus include a machining center, a robot, a milling machine, a multitasking machine, a general-purpose machine, and a portable type apparatus having such a size that a user can hold it in hand and perform friction stir welding. Control conditions (such as the position, load, main shaft load, heat, pressing) for the welding apparatus, its accessory mechanism, and the like, are not particularly limited, either. Welding conditions (the feed speed, rotation speed, welding temperature, forward angle) are not particularly limited, either. A material of the welding object member is not particularly limited. The welding object member may be made of either a homogeneous material or a heterogeneous material. Although the clearance, in the embodiment described later, is formed by the presence of a key (a fitting key or a fixing key), this is a non-limiting example. A structure for forming the clearance is not particularly limited, and a conventionally known structure is adoptable. Instead of the key, a member such as a bolt, a pin, or a spherical body may be adoptable as a member for forming the clearance. Alternatively, the shape of the rotating member for friction stirring itself may be used to form the clearance. It may be acceptable that the rotating member for friction stirring can be divided into plural (for example, two) members so that the clearance is formed when adjacent ones of the members are fitted to each other. The amplitude and frequency of the vibration are not particularly limited, but may be adjustable by changing the amount of the clearance or the weight of a member on the downstream side of the clearance in the power transmission path extending from the driving mechanism to the pin portion. For example, the change of the weight can be achieved by, for example, placing a weight. In the welding apparatus, the driving mechanism includes a rotating machine. The rotating machine may be, for example, a rotating electric machine or an internal combustion engine. The driving mechanism may include a transmission that changes the speed of rotation outputted from the rotating machine and outputs the changed speed. The transmission may be either a speed reducer or a speed increaser. In a case of the driving mechanism including the transmission, an output shaft of the transmission corresponds to the output shaft of the driving mechanism. In a case of the driving mechanism including no transmission, an output shaft of the rotating machine corresponds to the output shaft of the driving mechanism. In an embodiment, both a backlash and a margin within the driving mechanism do not correspond to the clearance. In an embodiment, the clearance is disposed downstream of an upstream edge of the output shaft of the driving mechanism in the power transmission path extending from the driving mechanism to the pin portion.

(2) The rotating member for friction stirring according to (1), including:
a rotation shaft portion arranged to the output shaft; and
a distal end portion configured to be rotated by rotation received from the rotation shaft portion, the distal end portion being positioned toward a distal end side relative to the rotation shaft portion, the distal end portion either being configured to have the pin portion and a proximal end side portion disposed on a proximal end side of the pin portion, or being configured to not have the pin portion but have a proximal end side portion to which the pin portion can be detachably attached, the clearance being disposed between the rotation shaft portion and the distal end portion so as to allow the pin portion to vibrate relative to the rotation shaft portion, the rotating member for friction stirring being configured such that due to the clearance, at a time of friction stirring, a vibration of the pin portion has a larger amplitude and/or a higher frequency than a vibration of the rotation shaft portion.

The rotating member for friction stirring according to (2) has the clearance between the rotation shaft portion and the distal end portion. Due to the clearance, at a time of friction stirring, the vibration of the pin portion has a larger amplitude and/or a higher frequency than the vibration of the output shaft. This vibration is not a vibration caused by an output from a driving source other than the driving mechanism. This vibration is less likely to hinder the plastic flow of the welding object member. Furthermore, this vibration can amplify the plastic flow of the welding object member. Accordingly, welding with a high strength and with occurrence of a welding defect suppressed can be obtained.

In a case where the pin portion and the proximal end side portion are configured integrally, the pin portion and the proximal end side portion can be distinguished from each other as follows: the pin portion is a portion to enter the welding object member while the proximal end side portion is a portion disposed on the proximal end side of the pin portion. In a case where the pin portion and the proximal end side portion are separable such as when the pin portion is configured to be attachable to and detachable from the proximal end side portion, it is possible to physically distinguish the pin portion and the proximal end side portion from each other. For example, the pin portion corresponds to the tool, and the proximal end side portion corresponds to the collet. In a case of the distal end portion having no pin portion, the distal end portion may be configured as the proximal end side portion itself to which the pin portion can be detachably attached.

(3) The rotating member for friction stirring according to (2), wherein the distal end portion has, on the proximal end side of the pin portion, a surface contact portion at a level of contact with a surface of the welding object member, and the ratio of a diameter of the surface contact portion to a diameter of the pin portion is 1.8 or less, the pin portion being adjacent to the surface contact portion and closer to the distal end than the surface contact portion, whereby the distal end portion is configured either to have a shoulder of which the width is small enough to satisfy the ratio, or to have no shoulder.

The vibration imparted to the pin portion due to the clearance is, as described above, less likely to hinder the plastic flow of the welding object member, and can amplify the plastic flow of the welding object member. In the rotating member for friction stirring according to (3), there is the shoulder having a small width or there is no shoulder, and therefore an area over which the shoulder is in contact with the surface of the welding object member as if it covers the welding object member, which is being given properties of a plastic flow, is reduced. A phenomenon in which the plastic flow is hindered by the shoulder does not easily occur. Consequently, the less likelihood of hindrance to the plastic flow and the capability of amplification of the plastic flow, which are advantageous effects exerted by the vibration of the pin portion, can be obtained more effectively. In addition, when the rotating shoulder has a small width or when the rotating shoulder is not provided, the amount of heat that the rotating shoulder generates in the welding object member is reduced, but it is possible to obtain an effective plastic flow thanks to the advantageous effects of the vibration of the pin portion. Consequently, it is possible to perform friction stir welding at a lower temperature. Friction stir welding at a low temperature can suppress an influence of the temperature on the welding object member. Accordingly, generation of a deformation or a stress due to heat can be suppressed, and thus mechanical properties of the welding object member may possibly be improved as compared to a welding object member having undergone the conventional friction stir welding. Furthermore, the lowering of the temperature at which the friction stir welding is performed can suppress the energy consumption. This also makes it possible that a material that is difficult to weld at a high temperature is adopted as the welding object member.

The above-mentioned ratio is, though not particularly limited, 1.8 or less in (3) above. The ratio is more preferably 1.5 or less, further preferably 1.3 or less, and especially preferably 1.1 or less. This is because occurrence of the phenomenon in which the plastic flow is hindered by the shoulder can be suppressed. When the ratio is 1.0, the rotating member for friction stirring has no shoulder. An aspect having no shoulder is one of preferred embodiments of the rotating member for friction stirring. The ratio may be less than 2.0, for example. In the conventional friction stir welding, the ratio is 2 or more, for example. The ratio may be 2 or more. Since the shoulder vibrates together with the pin portion, the advantageous effects of the less likelihood of hindrance to the plastic flow and the capability of amplification of the plastic flow can be obtained. Here, it may be acceptable that the shoulder is configured not to rotate together with the pin portion. Friction stir welding performed in an aspect having the shoulder not rotating with the pin portion is called Stationary Shoulder Friction Stir Welding (SSFSW). In SSFSW, a low heat input into a plastic flow portion (joint) is allowed, which can improve mechanical characteristics, a fine structure, and surface finishing of the plastic flow portion. As described above, the aspect in which the shoulder has a small width or the shoulder is not provided makes it possible to perform friction stir welding at a lower temperature, and therefore is suitably applicable to SSFSW. To be specific, in a case where the rotating member for friction stirring has a shoulder, the shoulder may be configured to rotate together with the pin portion, or may be configured not to rotate together with the pin portion. The rotating member for friction stirring or the welding apparatus may be equipped with a shoulder formed as a body separate from the rotating member for friction stirring, the shoulder being configured not to rotate together with the pin portion. The shoulder configured not to rotate together with the pin portion may be fixed to the rotating member for friction stirring or the welding apparatus in such a manner that the shoulder does not rotate at all, or may be configured as a rotatable body separate from the pin portion.

(4) The rotating member for friction stirring according to any one of (1) to (3), wherein the rotating member for friction stirring is configured such that a passive vibration is imparted to the pin portion within a range allowed by the clearance, the passive vibration being caused by contact of the pin portion with the welding object member, which is being given properties of a plastic flow.

In the rotating member for friction stirring according to (4), the pin portion is passively vibrated within a range allowed by the clearance, due to contact with the welding object member, which is being given properties of a plastic flow. At a time of friction stirring, the pin portion rotates while moving so as to parry the plastically flowing welding object member within a range allowed by the clearance, instead of resisting the plastically flowing welding object member. This movement passively generates the vibration of the pin portion. The vibration of the pin portion, therefore, is less likely to hinder the plastic flow of the welding object member. This vibration can amplify the plastic flow of the welding object member. Accordingly, welding with a high strength and with occurrence of a welding defect suppressed can be obtained.

(5) The rotating member for friction stirring according to any one of (1) to (4), wherein
the rotating member for friction stirring is configured such that due to the clearance, a vibration of the pin portion is generated in at least any of an axial direction, a circumferential direction, or a radial direction of the pin portion.

In the rotating member for friction stirring according to (5), welding with a high strength and with occurrence of a welding defect suppressed can be obtained thanks to the vibration of the pin portion in at least any of the directions.

If the clearance between the output shaft and the pin portion is provided in the axial direction, the pin portion is capable of vibrating in the axial direction. If the clearance is provided in the circumferential direction, the pin portion is capable of vibrating in the circumferential direction. If the clearance is provided in the radial direction, the pin portion is capable of vibrating in the radial direction. The clearance is provided in at least one of the axial direction, the circumferential direction, or the radial direction of the pin portion. Examples of the clearance provided between the output shaft and the pin portion include:

(A) a clearance in the axial direction only;
(B) a clearance in the circumferential direction only;
(C) a clearance in the radial direction only;
(D) a combination of a clearance in the axial direction and a clearance in the circumferential direction;
(E) a combination of a clearance in the axial direction and a clearance in the radial direction;
(F) a combination of a clearance in the circumferential direction and a clearance in the radial direction; and
(G) a combination of a clearance in the circumferential direction, a clearance in the axial direction, and a clearance in the radial direction.

In a case of (A), the pin portion is capable of vibrating at least in the axial direction.

In a case of (B), the pin portion is capable of vibrating at least in the circumferential direction.

In a case of (C), the pin portion is capable of vibrating at least in the radial direction.

In a case of (D), the pin portion is capable of vibrating at least in the axial direction and the circumferential direction.

In a case of (E), the pin portion is capable of vibrating at least in the axial direction and the radial direction.

In a case of (F), the pin portion is capable of vibrating at least in the circumferential direction and the radial direction.

In a case of (G), the pin portion is capable of vibrating in the axial direction, the circumferential direction, and the radial direction.

The description in this paragraph refers to a clearance provided between the output shaft and the pin portion, but for a case of a clearance provided between the rotation shaft portion and the distal end portion, this paragraph can be read with "output shaft" replaced with "rotation shaft portion." Although the amount of the clearance in any one of the directions is not particularly limited and varies depending on the size of the welding apparatus or the like, the amount is preferably 0.0001 mm to 1 mm, more preferably 0.001 mm to 0.8 mm, and further preferably 0.01 mm to 0.5 mm, for example. The axial direction is not always the up-down direction, but can be set depending on arrangement of the welding object member and the pin portion.

(6) The rotating member for friction stirring according to any one of (1) to (5), wherein
the rotating member for friction stirring is configured such that the pin portion is free or substantially free relative to the output shaft within a range allowed by the clearance.

In the rotating member for friction stirring according to (6), the pin portion is free or substantially free within a range allowed by the clearance, and therefore the vibration of the pin portion is passively generated by contact of the pin portion with the welding object member, which is being given properties of a plastic flow, and moreover the vibration of the pin portion has a larger amplitude and/or a higher frequency than the base vibration. This vibration is less likely to hinder the plastic flow of the welding object member. Furthermore, this vibration can amplify the plastic flow of the welding object member. Thanks to this vibration, welding with a high strength and with occurrence of a welding defect suppressed can be obtained.

Being free means a state of not being under physical or mechanical restraint. Being substantially free means being free enough to give the vibration of the pin portion at a time of friction stirring a larger amplitude and/or a higher frequency than those of the vibration of the output shaft so that restraint of the distal end portion relative to the output shaft is permissible within a range of the freedom. The restraint is, for example, a friction between adjacent members of the output shaft and the pin portion or an external stress attributable to an elastic body or liquid, which will be described later.

(7) The rotating member for friction stirring according to any one of (1) to (6), wherein
the clearance is void, or substantially void.

In the rotating member for friction stirring according to (7), the clearance is void or substantially void, and therefore the vibration of the pin portion is passively generated by contact of the pin portion with the welding object member, which is being given properties of a plastic flow, and moreover the vibration of the pin portion has a larger amplitude and/or a higher frequency than the base vibration. This vibration is less likely to hinder the plastic flow of the welding object member. Furthermore, this vibration can amplify the plastic flow of the welding object member. Thanks to this vibration, welding with a high strength and with occurrence of a welding defect suppressed can be obtained.

The void is a space between the output shaft and the pin portion. Being substantially void means being allowed to have liquid or an elastic body therein to such an extent that the vibration of the pin portion at a time of friction stirring can have a larger amplitude and/or a higher frequency than the vibration of the output shaft.

(8) A welding apparatus for performing friction stir welding of a welding object member, the welding apparatus including:
a driving mechanism including an output shaft, the driving mechanism being configured to rotate the output shaft; and
a pin portion configured to be rotated by rotation received from the driving mechanism, the pin portion being inserted into the welding object member at a time of friction stirring,
the pin portion being configured with a clearance that is formed between the output shaft and the pin portion, which allows the pin portion to vibrate relative to the output shaft, such that due to the clearance, at a time of friction stirring, a vibration of the pin portion has a larger amplitude and/or a higher frequency than a vibration of the output shaft.

In the welding apparatus according to (8), a clearance that allows the pin portion to vibrate relative to the output shaft is provided between the output shaft and the pin portion. The welding apparatus is configured such that due to the clearance, at a time of friction stirring, a vibration of the pin portion has a larger amplitude and/or a higher frequency than a vibration of the output shaft. The output shaft, at a time of friction stirring, vibrates along with rotation received from the driving mechanism. This vibration is the same as the base vibration mentioned above. At a time of friction stirring, the vibration of the pin portion has a larger amplitude and/or a higher frequency than the base vibration. This vibration is caused by the clearance. This vibration is not a vibration caused by an output from a driving source other than the driving mechanism. This vibration is less likely to hinder the plastic flow of the welding object member. Moreover, this vibration can amplify the plastic flow of the welding object member. Accordingly, welding with a high strength and with occurrence of a welding defect suppressed can be obtained.

(9) A welding method for performing friction stir welding of a welding object member by: rotating a pin portion through rotation outputted from a driving mechanism; and inserting the pin portion into the welding object member, wherein
at a time of friction stirring, the welding object member undergoes friction stirring while a passive vibration is imparted to the pin portion, the passive vibration being caused by contact of the pin portion with the welding object member, which is being given properties of a plastic flow, the passive vibration having a larger amplitude and/or a higher frequency than a base vibration that is transmitted from the driving mechanism to the pin portion as a result of rotation of the driving mechanism.

In the welding method according to (9), the vibration of the pin portion is passively generated by contact of the pin portion with the welding object member, which is being given properties of a plastic flow, and moreover the vibration of the pin portion has a larger amplitude and/or a higher frequency than the base vibration. This vibration is less likely to hinder the plastic flow of the welding object member. Furthermore, this vibration can amplify the plastic flow of the welding object member. Thanks to this vibration, welding with a high strength and with occurrence of a welding defect suppressed can be obtained.

(10) A welding method for performing friction stir welding of a welding object member by inserting a pin portion into the welding object member while rotating the pin portion through rotation outputted from a driving mechanism, wherein
while the welding object member is undergoing friction stirring, the driving mechanism is subjected to a feedback control such that an output of the driving mechanism is changed either in synchronization with a variation of rotation of the pin portion, or so as to follow a variation of rotation of the pin portion, the variation of the pin portion being passively generated by contact of the pin portion with the welding object member, which is being given properties of a plastic flow.

In the welding method according to (10), the vibration of the pin portion is controlled by the driving mechanism such that hindrance to the plastic flow of the welding object member by the vibration of the pin portion can be suppressed or prevented. This can make the plastic flow more liberated. Accordingly, welding with a high strength and with occurrence of a welding defect suppressed can be obtained.

Advantageous Effects of Invention

The present teaching can provide a rotating member for friction stirring, a welding apparatus, and a welding method that are capable of welding with a high strength and with occurrence of a welding defect suppressed.

DESCRIPTION OF EMBODIMENTS

FIG. 1(a) is a cross-sectional view schematically showing a rotating member 1 for friction stirring according to an embodiment. FIG. 1(b) is a cross-sectional view as taken along the line A-A of FIG. 1(a). In the figures, H, C, and T represent a holder, a collet, and a tool, respectively. AD, CD, and RD represent the axial direction, the circumferential direction, and the radial direction, respectively. The same interpretation applies to the other figures, though the reference signs mentioned above may be omitted in the other figures. In the drawings, if adjacent members of the rotating member 1 for friction stirring are given the same hatching pattern, it indicates that those members are in a fixed relationship. If different members are given different hatching patterns, it indicates that those members are in a non-fixed relationship. In the drawings, the same configurations are given the same reference signs.

The rotating member 1 for friction stirring is installed in a welding apparatus 3. The welding apparatus 3 is an apparatus for performing friction stir welding of a welding object member 2. The welding apparatus 3 has a driving mechanism 4. The rotating member 1 for friction stirring is detachably attached to an output shaft 5 of the driving mechanism 4. The rotating member 1 for friction stirring rotates with the output shaft 5 so that the rotating member 1 for friction stirring does not displace relative to the output shaft 5.

The rotating member 1 for friction stirring includes a rotation shaft portion 10, which is made of a metal, and a distal end portion 20, which is made of a metal. The rotation shaft portion 10 corresponds to the holder H. The rotation shaft portion 10 has a substantially columnar shape extending in the axial direction AD. The rotation shaft portion 10 is, at the upper surface side of the rotation shaft portion 10, fixed to the output shaft 5. The rotation shaft portion 10 has, at a lower surface of the rotation shaft portion 10, a bottomed hole for receiving the distal end portion 20. The bottomed hole opens downward. Disposed in the bottomed hole is the distal end portion 20.

Figure 1:
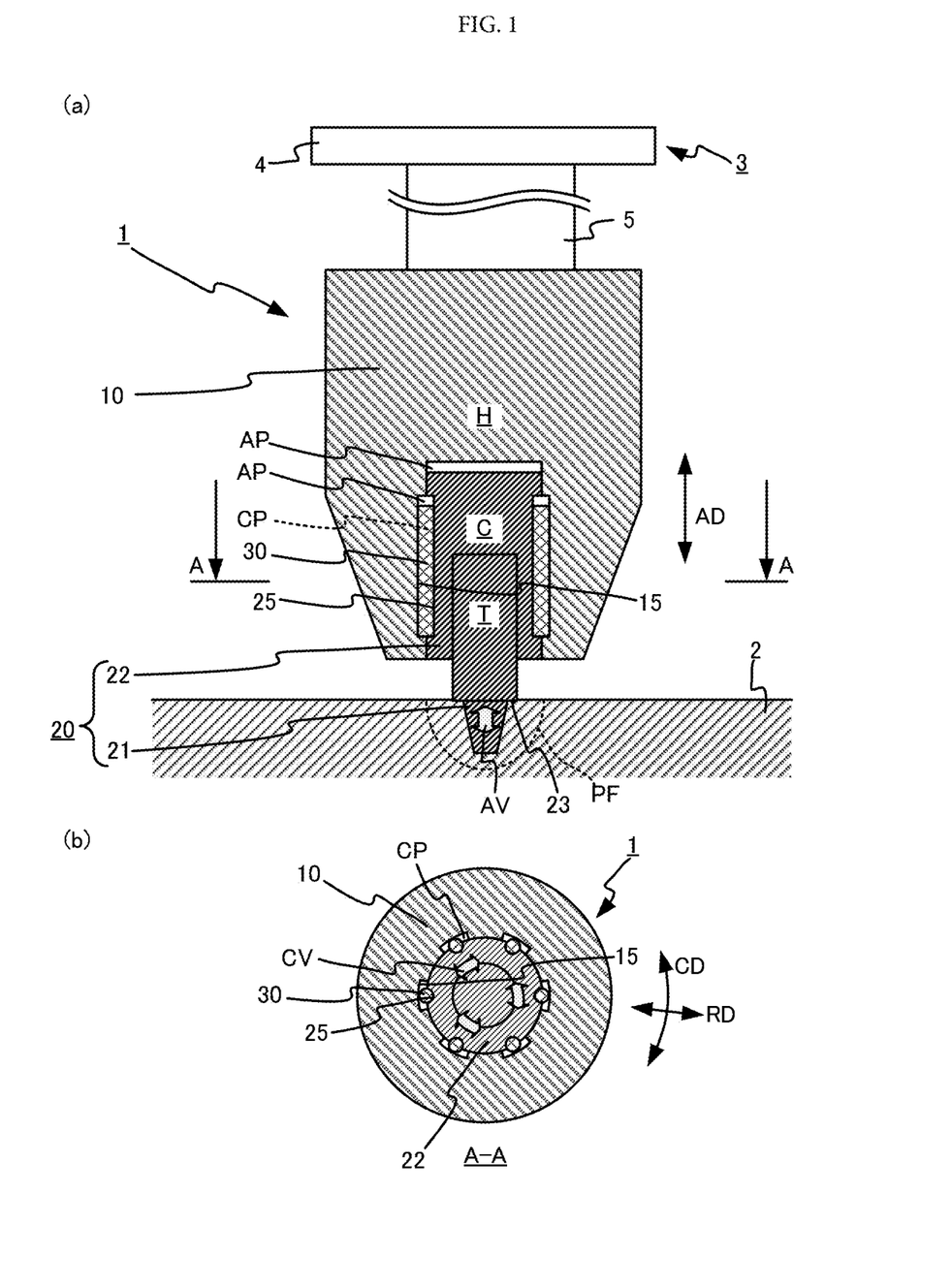
FIG. 1(a) is a cross-sectional view schematically showing a rotating member for friction stirring according to an embodiment.
FIG. 1(b) is a cross-sectional view as taken along the line A-A.

The distal end portion 20 has a pin portion 21 and a proximal end side portion 22, which is disposed on the proximal end side of the pin portion 21. The pin portion 21 corresponds to the tool T. The proximal end side portion 22 corresponds to the collet C. The proximal end side portion 22 has a substantially columnar shape extending in the axial direction AD. The proximal end side portion 22 has, in a lower surface of the proximal end side portion 22, a bottomed hole for receiving the pin portion 21. The bottomed hole opens downward. Disposed in the bottomed hole is the pin portion 21. The pin portion 21 is fixed to the proximal end side portion 22 so as not to displace relative to the proximal end side portion 22. At a time of friction stirring, the distal end of the pin portion 21 is inserted into the welding object member 2, as shown in FIG. 1(*a*). In the figures, PF schematically represents a plastic flow portion of the welding object member 2 at a time of friction stirring.

The distal end portion 20 has, on its outer circumferential surface, plural grooves 25 arranged at intervals in the circumferential direction CD, as shown in FIG. 1(*b*). The grooves 25 are formed so as to extend in the axial direction AD, as shown in FIG. 1(*a*). Provided in each of the grooves 25 is a rod-shaped fitting key 30, which is made of a metal. An inner portion of the fitting key 30 in the radial direction RD comes into the groove 25. An outer portion of the fitting key 30 in the radial direction RD is exposed to the outside of the groove 25 in the radial direction RD. The rotation shaft portion 10 has, on its inner circumferential surface, grooves 15 arranged at positions corresponding to where the respective fitting keys 30 are exposed. The length of the groove 15 in the circumferential direction CD is larger than the length of the fitting key 30 in the circumferential direction CD. Consequently, a clearance CP in the circumferential direction CD is present in the groove 15. The clearance CP is disposed between the rotation shaft portion 10 and the distal end portion 20. The rotation shaft portion 10 is fixed to the output shaft 5, and the distal end portion 20 includes the pin portion 21. Thus, the clearance CP is disposed between the output shaft 5 and the pin portion 21. The clearance CP is void, or substantially void. Within a range allowed by the clearance CP, the pin portion 21 is free or substantially free relative to the output shaft 5. The distal end portion 20 is configured such that due to the clearance CP, a vibration CV in the circumferential direction CD is produced against the rotation shaft portion 10 at a time of friction stirring, as shown in FIG. 1(*b*).

Further in the rotating member 1 for friction stirring, a clearance AP in the axial direction AD is present between the rotation shaft portion 10 and the distal end portion 20. In other words, the clearance AP is disposed between the output shaft 5 and the pin portion 21. The clearance AP is void, or substantially void. Within a range allowed by the clearance AP, the pin portion 21 is free or substantially free relative to the output shaft 5. The pin portion 21 is configured such that due to the clearance AP, a vibration AV in the axial direction AD is produced against the output shaft 5 at a time of friction stirring, as shown in FIG. 1(*a*).

Figure 2:
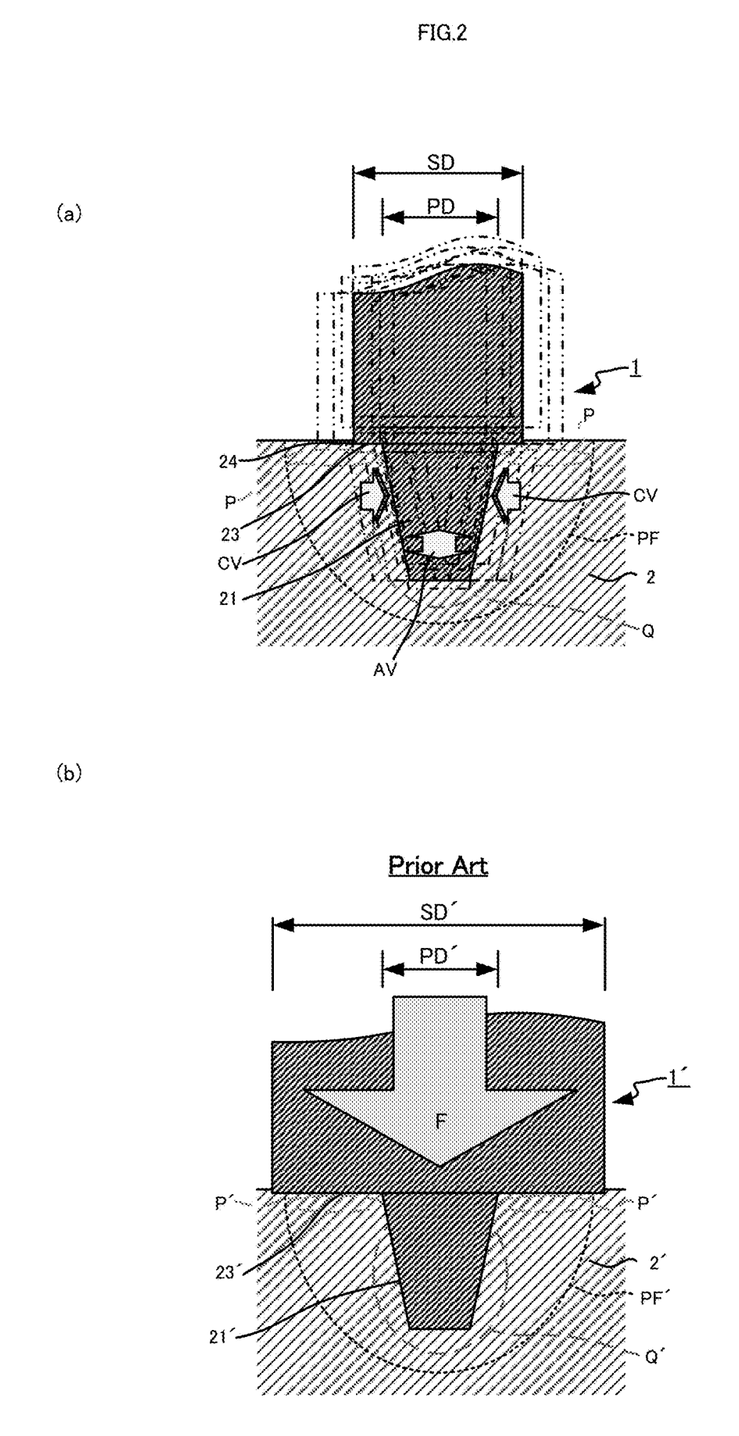
FIG. 2(a) is a cross-sectional view schematically showing a pin portion of the rotating member for friction stirring shown in FIG. 1(a), and therearound.
FIG. 2(b) is a cross-sectional view schematically showing a pin portion of a rotary tool according to a comparative example, and therearound.

FIG. 2(*a*) is a cross-sectional view schematically showing the pin portion 21 of the rotating member 1 for friction stirring shown in FIG. 1(*a*), and therearound.

The vibrations AV, CV of the pin portion 21 have a larger amplitude and/or a higher frequency than those of the output shaft 5 (see FIG. 1(*a*)). In FIG. 2(*a*), the alternate long and two short dashes lines indicate the pin portion 21 while the vibrations AV, CV are occurring in the plastic flow portion PF.

A region Q is a region in the welding object member 2, within a range covered by the vibrations AV, CV of the pin portion 21. In the region Q, therefore, a plastic flow of the welding object member 2 is generated by rotation of the pin portion 21. The pin portion 21 is in contact with the welding object member 2, which is being given properties of a plastic flow, within the range allowed by the clearances AP, CP. The pin portion 21 is free or substantially free within the range allowed by the clearances AP, CP. Accordingly, passive vibrations AV, CV are imparted to the pin portion 21. Since the vibrations AV, CV of the pin portion 21 are passive, they are not only less likely to hinder the plastic flow of the welding object member 2 but also capable of synchronization with and thus amplification of the plastic flow.

The pin portion 21 has a surface contact portion 24 at a level of contact with a surface of the welding object member 2. The ratio (diameter SD/diameter PD) of a diameter SD of the surface contact portion 24 to a diameter PD of the pin portion 21 located immediately below the surface contact portion 24 (the pin portion 21, which is adjacent to the surface contact portion 24, and is closer to the distal end than the surface contact portion 24) is 1.8 or less. Accordingly, the pin portion 21 has a shoulder 23 whose width is small enough to satisfy the ratio (diameter SD/diameter PD)≤1.8.

A region P is a region near the surface of the welding object member 2. Since the shoulder 23 of the pin portion 21 has the small width, a phenomenon in which the plastic flow is hindered by the shoulder 23 is less likely to occur. Advantageous effects exerted by the vibrations AV, CV of the pin portion 21 (advantageous effects of the less likelihood of hindrance to the plastic flow, and the capability of amplification of the plastic flow) can be obtained more effectively. Since the width of the shoulder 23 is small, a reduced amount of heat is generated at a time of friction stirring, but it is possible to obtain an effective plastic flow thanks to the effects of the vibrations AV, CV of the pin portion 21. Consequently, it is possible to perform friction stir welding at a lower temperature. That is, since the width of the shoulder 23 is small, the plastic flow is less likely to be hindered by the shoulder 23, and in the region P, a more amplified plastic flow can be obtained.

FIG. 2(*b*) is a cross-sectional view schematically showing a pin portion of a rotary tool 1' according to a comparative example (conventional technique), and therearound. The techniques disclosed in PTL 1 to PTL 3 correspond to this comparative example (conventional technique).

The rotary tool 1' is, at a time of friction stirring, biased downward by an elastic member (not shown). In the figure, F represents a biasing force. Due to the biasing force F, the rotary tool 1' is pushed against a welding object member 2', so that the amount of insertion of the rotary tool 1' into the welding object member 2' is kept constant in a plastic flow portion PF'. In a pin portion 21', the vibrations AV, CV as shown in FIG. 2(*a*) are not generated. A region Q' corresponds to the region Q in FIG. 2(*a*). In the region Q', the welding object member 2' is being given properties of a plastic flow at a location around the pin portion 21', but the pin portion 21', which is biased downward by the biasing force F, stays in the position. Consequently, the pin portion 21', which remains stationary, may hinder the plastic flow of the welding object member 2'. In addition, the effect of amplifying the plastic flow of the welding object member 2 cannot be obtained by the pin portion 21' remaining stationary.

In the rotary tool 1', the ratio (diameter SD'/PD') is not less than 2. The pin portion 21' has a shoulder 23' with a large width. In addition, by the biasing force F, the shoulder 23' is biased downward, and pushed against the welding object member 2'. In a region P', therefore, the plastic flow is hindered by the shoulder 23'. Moreover, since a large amount of heat is generated at a time of friction stirring because of the large width of the shoulder 23', it is difficult that the friction stir welding is performed at a low temperature.

Figure 3:
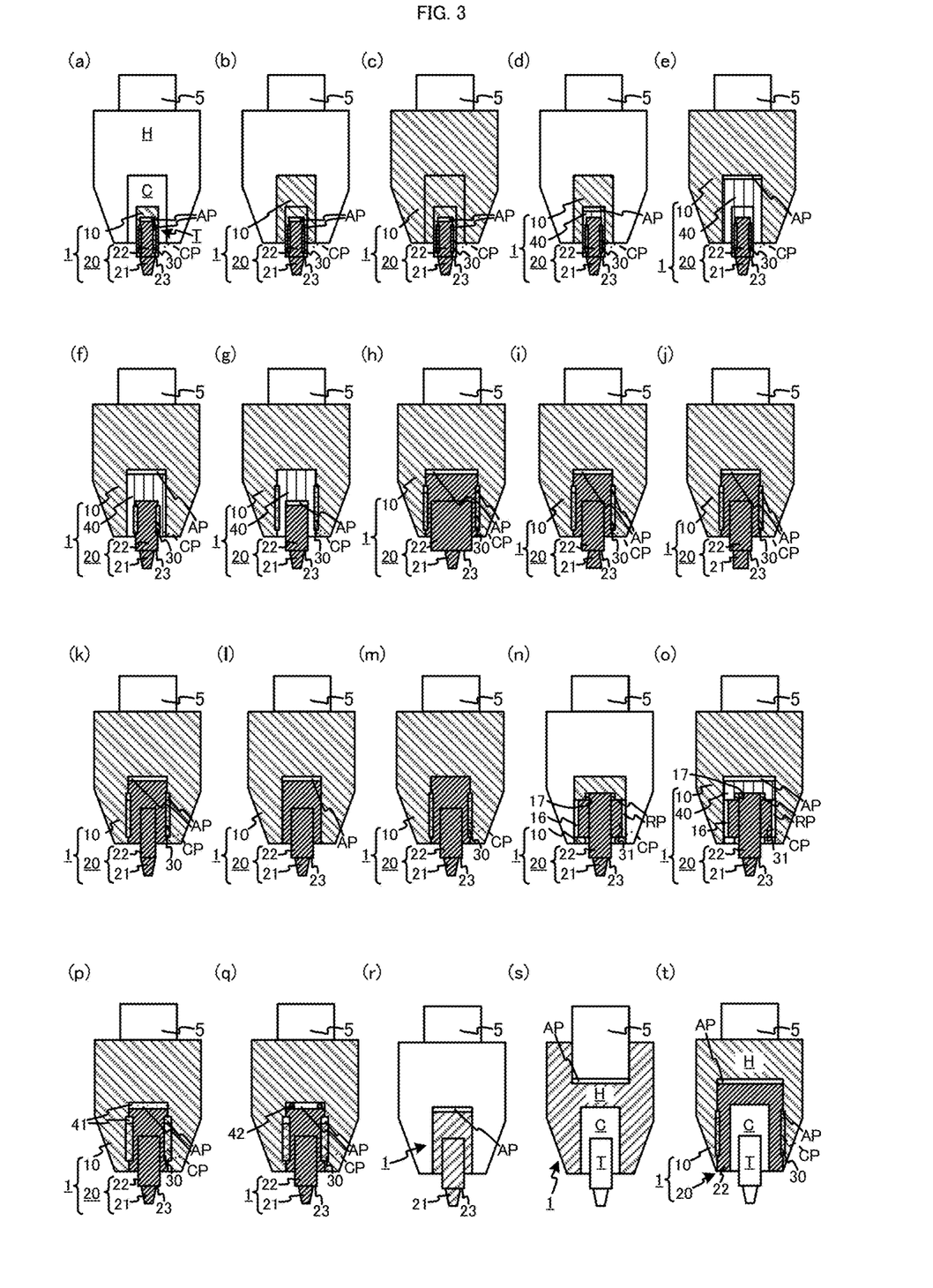
FIG. 3(a) to FIG. 3(t) are cross-sectional views each schematically showing a rotating member for friction stirring according to each variation.

FIG. 3(*a*) to FIG. 3(*t*) are cross-sectional views each schematically showing a rotating member 1 for friction stirring according to each variation. In FIG. 3(*a*), FIG. 3(*s*), and FIG. 3(*t*), H, C, and T represent a holder, a collet, and a tool, respectively. The same as in FIG. 3(*a*), FIG. 3(*s*), and FIG. 3(*t*) applies to FIG. 3(*b*) to FIG. 3(*r*), too, though in FIG. 3(*b*) to FIG. 3(*r*), indication of H, C, and T is omitted for convenience.

FIG. 3(*a*)

The rotating member 1 for friction stirring shown in FIG. 3(*a*), as a whole, corresponds to a tool T; a rotation shaft portion 10 corresponds to a part of the tool T; and a distal end portion 20 corresponds to a part of the tool T. The distal end portion 20 includes a proximal end side portion 22 and a pin portion 21 that are configured integrally. The distal end portion 20 is, by being inserted into a bottomed hole formed at a lower surface of the rotation shaft portion 10, attached to the rotation shaft portion 10. The lower surface of the rotation shaft portion 10 forms a shoulder 23. Disposed between the rotation shaft portion 10 and the distal end portion 20 are fitting keys 30 as shown in FIG. 1(*a*) and FIG. 1(*b*). As a result, the rotating member 1 for friction stirring has clearances AP, CP provided between the rotation shaft portion 10 and the distal end portion 20. The rotating member 1 for friction stirring is attached to a collet C. A holder H and the collet C are fixedly arranged to an output shaft 5, and thus the rotating member 1 for friction stirring is arranged to the output shaft 5 via the holder H and the collet C.

FIG. 3(*b*)

A rotating member 1 for friction stirring shown in FIG. 3(*b*) corresponds to a collet C and a tool T; a rotation shaft portion 10 corresponds to the collet C and a part of the tool T; and a distal end portion 20 corresponds to a part of the tool T. The rotating member 1 for friction stirring is arranged to an output shaft 5 via a holder H. Except for this point, the aspect shown in FIG. 3(*b*) is the same as that in FIG. 3(*a*).

FIG. 3(*c*)

A rotating member 1 for friction stirring shown in FIG. 3(*c*) corresponds to a holder H, a collet C, and a tool T; a rotation shaft portion 10 corresponds to the holder H, the collet C, and a part of the tool T; and a distal end portion 20 corresponds to a part of the tool T. The rotating member 1 for friction stirring is arranged to an output shaft 5. Except for this point, the aspect shown in FIG. 3(*c*) is the same as those in FIG. 3(*a*) and FIG. 3(*b*).

FIG. 3(*d*)

A rotating member 1 for friction stirring shown in FIG. 3(*d*) includes a rotation shaft portion 10, an intermediate member 40, and a distal end portion 20. The rotating member 1 for friction stirring corresponds to a collet C and a tool T. The rotation shaft portion 10 corresponds to the collet C. The intermediate member 40 corresponds to a part of the tool T. The distal end portion 20 corresponds to a part of the tool T. The distal end portion 20 is, by being inserted into a bottomed hole formed at a lower surface of the intermediate member 40 having a substantially columnar shape, attached to the intermediate member 40. The lower surface of the intermediate member 40 forms a shoulder 23. Disposed between the intermediate member 40 and the distal end portion 20 are fitting keys 30. In an example shown in FIG. 3(*d*), due to the presence of the fitting keys 30, a clearance CP is provided, while no clearance AP is provided. The distal end portion 20 is capable of vibrating in the circumferential direction CD (see FIG. 1) relative to the intermediate member 40. The intermediate member 40 is, by being inserted into a bottomed hole formed at a lower surface of the rotation shaft portion 10, attached to the rotation shaft portion 10. In this manner, a clearance AP is provided between the rotation shaft portion 10 and the intermediate member 40. The intermediate member 40 is capable of vibrating in the axial direction AD (see FIG. 1) relative to the rotation shaft portion 10. The clearances AP, CP disposed between the rotation shaft portion 10 and the distal end portion 20 may not always have to be defined by the rotation shaft portion 10 and the distal end portion 20. It may be possible that the intermediate member 40 is interposed between the rotation shaft portion 10 and the distal end portion 20, the intermediate member 40 being capable of displacing relative to each of the rotation shaft portion 10 and the distal end portion 20 individually. Accordingly, the rotating member 1 for friction stirring, as a whole, has the clearances AP, CP between the rotation shaft portion 10 and the distal end portion 20.

FIG. 3(*e*)

A rotating member 1 for friction stirring shown in FIG. 3(*e*), like in FIG. 3(*d*), includes a rotation shaft portion 10, an intermediate member 40, and a distal end portion 20. The rotating member 1 for friction stirring corresponds to a holder H, a collet C, and a tool T. The rotation shaft portion 10 corresponds to the holder H. The intermediate member 40 corresponds to the collet C and a part of the tool T. The distal end portion 20 corresponds to a part of the tool T. The aspect shown in FIG. 3(*e*) is different from that in FIG. 3(*d*), in terms of the position of a clearance AP.

FIG. 3(*f*)

In an aspect shown in FIG. 3(*f*), a rotating member 1 for friction stirring corresponds to a holder H, a collet C, and a tool T. A rotation shaft portion 10 corresponds to the holder H. An intermediate member 40 corresponds to the collet C. A distal end portion 20 corresponds to the tool T. Disposed between the intermediate member 40 and the distal end portion 20 are fitting keys 30, by which a clearance CP is provided between the intermediate member 40 and the distal end portion 20. A clearance AP is provided between the rotation shaft portion 10 and the intermediate member 40.

FIG. 3(*g*)

In an aspect shown in FIG. 3(*g*), unlike in FIG. 3(*f*), fitting keys 30 are disposed between a rotation shaft portion 10 and an intermediate member 40, and consequently a clearance CP is provided between the rotation shaft portion and the intermediate member 40. A clearance AP is provided between the intermediate member 40 and a distal end portion 20.

FIG. 3(*h*)

In an aspect shown in FIG. 3(*h*), the width of a shoulder 23 is larger than that in FIG. 1. The above-mentioned ratio is not less than 2. The shoulder 23 is unified with a pin portion 21, and therefore the same vibration as generated in the pin portion 21 is generated in the shoulder 23, too. Consequently, in spite of the large width of the shoulder 23, a plastic flow of a welding object member 2 is less likely to be hindered, and amplification of the plastic flow is allowed. In this point, the aspect shown in FIG. 3(*h*) is different from the comparative example shown in FIG. 2(*b*). Here, it should be noted that the shoulder 23 may be configured as a member separate from the pin portion 21 so as not to rotate together with the pin portion 21.

FIG. 3(*i*), FIG. 3(*j*)

Aspects shown in FIG. 3(*i*) and FIG. 3(*j*) are different from that in FIG. 1, in terms of the shape of a distal end of a pin portion 21. In FIG. 1, the distal end of the pin portion 21 is in the shape of a tapered truncated cone (a truncated cone shape with its distal end side thinner than its proximal end side), whereas in FIG. 3(*i*), the distal end of the pin portion 21 is in the shape of an inverted truncated cone (a truncated cone shape with its distal end side thicker than its proximal end side). In FIG. 3(*j*), the distal end of the pin portion 21 has a columnar shape. In this manner, the shape of the distal end of the pin portion 21 is not particularly limited. Various shapes may be employed as the shape of the pin portion 21.

FIG. 3(*k*)

In an aspect shown in FIG. 3(*k*), the above-mentioned ratio is 1.0, and a rotating member 1 for friction stirring has no shoulder. The rotating member 1 for friction stirring, which does not have a rotating shoulder, is capable of performing friction stir welding at a lower temperature.

FIG. 3(*l*), FIG. 3(*m*)

In an aspect shown in FIG. 3(*l*), unlike in FIG. 1, a rotating member 1 for friction stirring has only a clearance AP in the axial direction AD (see FIG. 1). In an aspect shown in FIG. 3(*m*), a rotating member 1 for friction stirring has only a clearance CP in the circumferential direction CD (see FIG. 1). It may be acceptable that the rotating member 1 for friction stirring has a clearance in only any one of the axial direction AD, the circumferential direction CD, or the radial direction RD.

FIG. 3(*n*)

In an aspect shown in FIG. 3(*n*), a rotating member 1 for friction stirring corresponds to a collet C and a tool T. A rotation shaft portion 10 corresponds to the collet C. A distal end portion 20 corresponds to the tool T. The distal end portion 20 has a pin portion 21 and a proximal end side portion 22 that are configured integrally with each other. The distal end portion 20 is attached to the rotation shaft portion 10 by being loosely fitted to a large-diameter bottomed hole 17 formed at a lower surface of the rotation shaft portion 10. The large-diameter bottomed hole 17 has a diameter larger than the diameter of the proximal end side portion 22, which results in a clearance RP in the radial direction RD (see FIG. 1) appearing around the proximal end side portion 22. Fixed to an outer surface of the proximal end side portion 22 is a fixing key 31. The rotation shaft portion 10 has a side through hole 16 disposed at a position corresponding to the fixing key 31. The presence of the side through hole 16 makes a clearance CP as well as the clearance RP. Thus, there are the clearance CP and the clearance RP between the distal end portion 20 and the rotation shaft portion 10. The distal end portion 20 is capable of vibrating in the circumferential direction CD and in the radial direction RD relative to the rotation shaft portion 10.

FIG. 3(*o*)

In an aspect shown in FIG. 3(*o*), a rotating member 1 for friction stirring includes a rotation shaft portion 10, an intermediate member 40, and a distal end portion 20. The rotating member 1 for friction stirring corresponds to a holder H, a collet C, and a tool T. The rotation shaft portion 10 corresponds to the holder H. The intermediate member 40 corresponds to the collet C. The distal end portion 20 corresponds to the tool T. The distal end portion 20 has a pin portion 21 and a proximal end side portion 22 that are configured integrally with each other. The distal end portion 20 is attached to the intermediate member 40 by being loosely fitted to a large-diameter bottomed hole 17 formed at a lower surface of the intermediate member 40. The large diameter bottomed hole 17 has a diameter larger than the diameter of the proximal end side portion 22, which results in a clearance RP in the radial direction RD (see FIG. 1) appearing around the proximal end side portion 22. Fixed to an outer surface of the proximal end side portion 22 is a fixing key 31. The intermediate member 40 has a side through hole 16 disposed at a position corresponding to the fixing key 31. The presence of the side through hole 16 makes a clearance CP as well as the clearance RP. Thus, there are the clearance CP and the clearance RP between the distal end portion 20 and the intermediate member 40. The distal end portion 20 is capable of vibrating in the circumferential direction CD and in the radial direction RD relative to the intermediate member 40. The intermediate member 40 is attached to the rotation shaft portion 10 by being inserted into a bottomed hole formed at a lower surface of the rotation shaft portion 10. As a result, a clearance AP is provided between the rotation shaft portion 10 and the intermediate member 40. The intermediate member 40 is capable of vibrating in the axial direction AD (see FIG. 1) relative to the rotation shaft portion 10. As thus described above, in the rotating member 1 for friction stirring, there are the clearances AP, CP, RP between the rotation shaft portion 10 and the distal end portion 20. Accordingly, the distal end portion 20 is capable of vibrating relative to the rotation shaft portion 10 in all of the axial direction AD, the circumferential direction CD, and the radial direction RD.

FIG. 3(p)

An aspect shown in FIG. 3(p) is different from the aspect shown in FIG. 1, in that clearances AP, CP are not void but the clearances AP, CP are filled with liquid 41 (for example, a lubricant). A rotating member 1 for friction stirring of this type is also capable of providing a vibration of a pin portion 21 like the one described with FIG. 2(a), and thus is obviously different from the aspect shown in FIG. 2(b). That is, the clearances AP, CP are substantially void. A distal end portion 20 is substantially free within a range allowed by the clearances AP, CP.

FIG. 3(q)

An aspect shown in FIG. 3(q) is different from the aspect shown in FIG. 1, in that an elastic body 42 (for example, an O-ring) is disposed in a clearance AP between a rotation shaft portion 10 and a distal end portion 20. A rotating member 1 for friction stirring of this type is also capable of providing a vibration of a pin portion 21 like the one described with FIG. 2(a), and thus is obviously different from the aspect shown in FIG. 2(b). That is, the clearances AP, CP are substantially void. A distal end portion 20 is substantially free within a range allowed by the clearances AP, CP.

Illustrated in each of the foregoing examples is the case where the rotating member 1 for friction stirring includes the rotation shaft portion 10 and the distal end portion 20 with the clearance disposed between the rotation shaft portion 10 and the distal end portion 20, and the distal end portion 20 includes the pin portion 21. The rotating member 1 for friction stirring, however, is not limited to the foregoing examples, but may adopt the following aspects, for example.

FIG. 3(r)

In an aspect shown in FIG. 3(r), a rotating member 1 for friction stirring corresponds to a collet C and a tool T. The rotating member 1 for friction stirring, which as a whole is configured integrally, includes a pin portion 21 and a shoulder 23. The rotating member 1 for friction stirring is configured such that a clearance AP is formed between the rotating member 1 for friction stirring and a holder H when the rotating member 1 for friction stirring is attached to the holder H. Due to the presence of the clearance AP, the rotating member 1 for friction stirring, including the pin portion 21, vibrates in the axial direction AD relative to an output shaft 5 at a time of friction stirring.

FIG. 3(s)

In an aspect shown in FIG. 3(s), a rotating member 1 for friction stirring corresponds to a holder H. The rotating member 1 for friction stirring has, in its lower surface, a bottomed hole in which a collet C and a tool T are inserted. As a result of the collet C and the tool T being inserted into the bottomed hole, the collet C and the tool T are detachably disposed in the rotating member 1 for friction stirring. The rotating member 1 for friction stirring includes no pin portion. A pin portion is included in the tool T. The rotating member 1 for friction stirring has, in its upper surface, a bottomed hole for receiving an output shaft 5. As a result of the output shaft 5 being inserted into the bottomed hole, the rotating member 1 for friction stirring is attached to the output shaft 5. The rotating member 1 for friction stirring is configured such that when the rotating member 1 for friction stirring is attached to the output shaft 5, a clearance AP is formed between the output shaft 5 and the rotating member 1 for friction stirring. Consequently, at a time of friction stirring, the clearance AP is formed between the output shaft 5 and the pin portion of the tool T. The clearance AP enables the pin portion to vibrate relative to the output shaft 5.

FIG. 3(t)

In an aspect shown in FIG. 3(t), a rotating member 1 for friction stirring includes a rotation shaft portion 10 and a distal end portion 20. The rotating member 1 for friction stirring corresponds to a holder H. The rotation shaft portion 10, which is an upper portion of the holder H, is attached to an output shaft 5. The distal end portion 20, which is a lower portion of the holder H, is configured so as to be rotated by rotation received from the rotation shaft portion 10, and is positioned toward a distal end side relative to the rotation shaft portion 10. The distal end portion 20 is configured such that a collet C and a tool T can be detachably attached thereto. To be specific, the distal end portion 20, though not having a pin portion, has a proximal end side portion 22 to which a pin portion can be detachably attached. Clearances AP, CP are disposed between the rotation shaft portion 10 and the distal end portion 20 so as to allow the pin portion to vibrate relative to the rotation shaft portion 10.

The rotating member 1 for friction stirring is not limited to the foregoing examples. It is just required that the rotating member 1 for friction stirring be configured such that a clearance can be formed between the output shaft 5 and the pin portion 21 when the rotating member 1 for friction stirring is attached to the output shaft 5. It is not always necessary that the rotating member 1 for friction stirring can be divided into components, namely, a holder H, a collet C, and a tool T.

<Welding Apparatus>

A welding apparatus according to an embodiment is the welding apparatus 3 shown in FIG. 1(a) and FIG. 1(b), including the rotating member 1 for friction stirring. The welding apparatus 3 includes the driving mechanism 4 having the output shaft 5, and the pin portion 21. The pin portion 21 is provided such that there are the clearances AP, CP between the output shaft 5 and the pin portion 21, the clearances AP, CP allowing the vibrations AV, CV of the pin portion 21 relative to the output shaft 5. In the welding apparatus 3, due to the clearances AP, CP, the vibrations AV, CV of the pin portion 21 at a time of friction stirring have a larger amplitude and/or a higher frequency than a vibration (base vibration) of the output shaft 5. Although the welding apparatus 3 according to this embodiment includes the rotating member 1 for friction stirring having the clearances AP, CP, the rotating member 1 for friction stirring may not always have to be provided, and the welding apparatus 3 is just required to have a clearance between the output shaft 5 and the pin portion 21.

<Welding Method>

A welding method according to an embodiment can be performed by the foregoing welding apparatus 3 shown in FIG. 1(a) and FIG. 1(b). In this welding method, the driving mechanism 4 outputs rotation, by which the pin portion 21 is rotated, and the pin portion 21 is inserted into the welding object member 2, so that the welding object member 2 undergoes friction stir welding. In this welding method, at a time of friction stirring, the welding object member 2 undergoes friction stirring while a passive vibration is imparted to the pin portion 21, the passive vibration being caused by contact of the pin portion 21 with the welding object member 2, which is being given properties of a plastic flow, the passive vibration having a larger amplitude and/or a higher frequency than a base vibration that is transmitted from the driving mechanism 4 to the pin portion 21 as a result of rotation of the driving mechanism 4.

In a welding method according to another embodiment, the driving mechanism 4 outputs rotation, by which the pin portion 21 is rotated, and in this state the pin portion 21 is inserted into the welding object member 2, so that the welding object member 2 undergoes friction stir welding. In this welding method, while the welding object member 2 is undergoing friction stirring, the driving mechanism 4 is subjected to a feedback control such that an output of the driving mechanism 4 is changed in synchronization with or so as to follow a variation of rotation of the pin portion 21, the variation being passively generated by contact of the pin portion 21 with the welding object member 2, which is being given properties of a plastic flow. The variation of rotation can be detected by a conventionally known rotation speed sensor such as a resolver or an encoder.

Here, the numerical values, the materials, the structures, the shapes, and the like shown in the foregoing embodiment are only illustrative, and different numerical values, materials, structures, shapes, and the like may be adopted as necessary. In the foregoing embodiment, the rotating member 1 for friction stirring is positioned upward, the welding object member 2 is positioned downward, and the rotating member 1 for friction stirring and the welding object member 2 face each other in the up-down direction. That is, the axial direction is coincident with the up-down direction. The axial direction, however, may not always have to be coincident with the up-down direction. The axial direction is not particularly limited, and may be the horizontal direction, for example. It may be possible that in a case where the axial direction is the up-down direction, the rotating member for friction stirring is positioned downward while the welding object member is positioned upward. The axial direction may not always have to be fixed. In a welding apparatus configured with the rotating member for friction stirring installed in the above-mentioned portable type apparatus, the axial direction may change during an operation.

REFERENCE SIGNS LIST rotating member for friction stirring: 1
welding object member: 2
welding apparatus: 3
driving mechanism: 4
output shaft (of driving mechanism): 5
rotation shaft portion: 10
groove: 15
side through hole: 16
large-diameter bottomed hole: 17
distal end portion: 20
pin portion: 21
proximal end side portion: 22
shoulder: 23
surface contact portion: 24
groove: 25
fitting key: 30
fixing key: 31
intermediate member: 40
liquid: 41
elastic body: 42

The invention claimed is:

1. A rotating member for friction stir welding, the rotating member securable to a welding apparatus having a driving mechanism including a rotatable output shaft having a longitudinal axis, the rotating member configured to connect a pin portion,
   wherein, when the pin portion is connected with the rotating member and when the rotating member is arranged to engage the rotatable output shaft such that it is rotatable by a rotational force output by the output shaft, a clearance is formed between the rotatable output shaft and the pin portion at one or more positions that are axially disposed, circumferentially disposed, or radially disposed relative to the longitudinal axis,
   wherein the clearance is void or substantially void and the pin portion is freely movable or substantially freely movable relative to the output shaft within a range allowed by the clearance, and,
   wherein, at a time of friction stir welding, when the pin portion is connected with the rotating member and inserted into a welding object member and the rotational force output by the rotatable output shaft applied, the clearance allows the pin portion to vibrate relative to the rotatable output shaft, and due to the clearance a vibration of the pin portion has a larger amplitude and/or a higher frequency than a base vibration of the rotatable output shaft.

2. The rotating member for friction stir welding according to claim 1, further comprising:
   a rotation shaft portion detachably securable to the rotatable output shaft; and
   a distal end portion configured to be rotated by the rotational force transmitted by the rotation shaft portion, the distal end portion being positioned toward a distal end of the rotation shaft portion,
   the distal end portion comprising one of:
      the pin portion and a proximal end side portion integrally connected at a proximal end of the pin portion, or
      the proximal end side portion that detachably secures the pin portion,
   the clearance being disposed between the rotation shaft portion and the distal end portion (20) so as to allow the pin portion to vibrate relative to the rotation shaft portion.

3. The rotating member for friction stir welding according to claim 2,
   wherein the pin portion (21) defines:
      a surface contact diameter at a level of contact with an upper surface of the welding object member, and,
      a pin contact diameter at a level of contact with the welding object that is adjacent the surface contact diameter,
   wherein, a ratio of the surface contact diameter to the pin contact diameter is 1.8 or less, and,
   wherein the pin portion includes one of:
      a shoulder having a width satisfying the ratio, or
      no shoulder.

4. The rotating member for friction stir welding according to claim 1, wherein
   the rotating member imparts a passive vibration to the pin portion within a range allowed by the clearance, the passive vibration being caused by contact of the pin portion with the welding object member.

5. The rotating member for friction stir welding according to claim 1, wherein due to the clearance, the rotating member imparts the vibration to the pin portion in at least one or more of an axial direction, a circumferential direction, or a radial direction.

6. The rotating member for friction stir welding according to claim 1,
wherein the clearance defines a range of freedom of movement of the pin portion relative to the output shaft.

7. The rotating member for friction stir welding according to claim 1, wherein
the clearance comprises a void.

8. A welding apparatus for performing friction stir welding of a welding object member, the welding apparatus comprising:
a driving mechanism including an output shaft, the driving mechanism being configured to rotate the output shaft; and
a pin portion rotatable by a rotational force received from the driving mechanism, the pin portion being inserted into the welding object member at a time of friction stirring, wherein, a clearance is formed at one or more positions between the pin portion and the output shaft, the clearance being void or substantially void and the pin portion is freely movable or substantially freely movable relative to the output shaft within a range allowed by the clearance, the clearance allowing the pin portion to vibrate relative to the output shaft such that at a time of friction stirring a vibration of the pin portion has a larger amplitude and/or a higher frequency than a base vibration of the output shaft.

9. A method of performing friction stir welding of a welding object member with the welding apparatus including the rotating member of claim 1, the method comprising:
connecting the pin portion to the rotating member;
rotating the pin portion through rotation output by the driving mechanism;
inserting the pin portion into the welding object member; and,
imparting plastic flow to a region of the welding object member in contact with the rotating pin portion;
wherein a passive vibration is imparted to the rotating pin portion as a result of the clearance, the clearance disposed at one or more positions between the rotating pin portion and the output shaft of the driving mechanism, the passive vibration having a larger amplitude and/or a higher frequency than a base vibration transmitted from the driving mechanism to the pin portion as a result of rotation of the driving mechanism.

10. A method of performing friction stir welding of a welding object member with the welding apparatus of claim 8, the method comprising:
rotating the pin portion through rotation output by the driving mechanism;
inserting the pin portion into the welding object member; and,
imparting plastic flow to a region of the welding object member in contact with the rotating pin portion;
wherein a passive vibration is imparted to the rotating pin portion as a result of the clearance, the clearance disposed at one or more positions between the rotating pin portion and the output shaft of the driving mechanism, the passive vibration having a larger amplitude and/or a higher frequency than a base vibration transmitted from the driving mechanism to the pin portion as a result of rotation of the driving mechanism.

11. A rotating member for friction stir welding a welding object member, the rotating member connectable with an output shaft of a rotatable driving mechanism, the rotating member comprising:
a pin portion receiving structure configured to connect a pin portion with the rotating member;
wherein, when rotating member is connected with the output shaft and the pin portion is connected with the rotating member via the pin receiving structure, one or more clearances are formed at one or more positions that are axially disposed, circumferentially disposed, or radially disposed relative to a longitudinal axis of the output shaft, the one or more clearances disposed between the pin portion and the output shaft, the one or more clearances being void or substantially void and the pin portion is freely movable or substantially freely movable relative to the output shaft within a range allowed by the one or more clearances, and,
wherein, the one or more clearances allow the pin portion to vibrate relative to the output shaft within the range defined by the one or more clearances.

12. The rotating member of claim 11, wherein when rotating member is connected with the output shaft, the pin portion is connected with the rotating member via the pin receiving structure, and when the pin portion is rotated by the rotatable driving mechanism and inserted into the welding object member such that plastic flow is imparted to a region of the welding object member proximate the point of contact of the pin portion with the welding object member, the clearance allows the pin portion to vibrate relative to the output shaft within the range defined by the one or more clearances, and due to the one or more clearances, the vibration of the pin portion has a larger amplitude and/or a higher frequency than a base vibration of the output shaft.

13. The rotating member of claim 11, further comprising one or more of:
a tool member (T) including the pin portion;
a collet member (C) adapted to detachably secure the tool member (T); and/or
a holder member (H) adapted to detachably secure one or more of the tool member and/or the collet member (C).

14. The rotating member of claim 13 including the tool member, the collet member, and the holder member, wherein when the pin portion is connected with the pin portion receiving structure and the rotating member is connected with output shaft, the one or more clearances are formed between one or more of: the pin portion and the collet member, the collet member and the holder member, and/or the holder member and the output shaft.

15. The rotating member of claim 1, wherein when the rotating member for friction stirring engages the rotatable output shaft and when the pin portion is connected with the rotating member, the clearance is disposed at one or more positions:
between the rotatable output shaft and the rotating member;
between the rotatable output shaft and a coupling member that connects the rotating member to the rotatable output shaft; and/or,
between the pin portion and the rotating member.

16. The rotating member of claim 1, wherein the pin portion is detachably connected with the rotating member.

17. The rotating member of claim 16, wherein the rotating member includes a pin portion receiving structure that detachably connects the pin portion.

18. The rotating member of claim 1, wherein the pin portion is integral with the rotating member.

\* \* \* \* \*